(12) United States Patent
Hu et al.

(10) Patent No.: US 11,888,640 B2
(45) Date of Patent: Jan. 30, 2024

(54) SYSTEM AND METHOD FOR DATA TRANSMISSION FOR APPLIANCE

(71) Applicant: Haier US Appliance Solutions, Inc., Wilmington, DE (US)

(72) Inventors: Haitian Hu, Louisville, KY (US); Steven Keith Root, Buckner, KY (US); Hairong Li, Louisville, KY (US); James Quentin Pollett, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 17/735,407

(22) Filed: May 3, 2022

(65) Prior Publication Data
US 2023/0362027 A1    Nov. 9, 2023

(51) Int. Cl.
H04L 12/28 (2006.01)

(52) U.S. Cl.
CPC ...... H04L 12/2807 (2013.01); H04L 12/2816 (2013.01); H04L 2012/285 (2013.01)

(58) Field of Classification Search
CPC ........... H04L 2012/285; H04L 12/2816; H04L 12/2807
See application file for complete search history.

(56) References Cited

U.S. PATENT DOCUMENTS

| | | | |
|---|---|---|---|
| 8,903,971 B2 | 12/2014 | DeVilbiss et al. | |
| 9,013,320 B2 * | 4/2015 | Ha | G05B 15/02 379/106.01 |
| 10,333,731 B2 | 6/2019 | Ebrom et al. | |
| 10,884,403 B2 | 1/2021 | Atensmeier | |
| 11,009,250 B2 | 5/2021 | Wallace et al. | |
| 11,544,580 B2 * | 1/2023 | Nachlieli | G06F 16/288 |
| 11,587,559 B2 * | 2/2023 | Newendorp | H04N 21/4122 |
| 2005/0017849 A1 * | 1/2005 | Flen | H04B 3/542 307/3 |
| 2006/0176942 A1 * | 8/2006 | Oksman | H04L 1/0025 375/222 |
| 2014/0244834 A1 * | 8/2014 | Guedalia | H04W 4/08 709/224 |
| 2014/0277906 A1 * | 9/2014 | Lowrey | G07C 5/008 701/31.4 |
| 2016/0100028 A1 * | 4/2016 | Erdmann | H04L 12/2823 709/219 |

(Continued)

FOREIGN PATENT DOCUMENTS

| | | |
|---|---|---|
| EP | 3813473 A1 | 4/2021 |
| WO | WO2020240576 A1 | 12/2020 |

*Primary Examiner* — Todd L Barker
(74) *Attorney, Agent, or Firm* — Dority & Manning, P.A.

(57) ABSTRACT

A system and method for data transmission and performance improvement for an appliance is provided. The system includes an appliance including a controller operably connected to a network computing device. The controller is configured to transmit a packet to a network computing device. The packet includes genealogical data for the appliance encoded in a positional numeral system. The network computing device is configured to receive the packet and decode the genealogical data for the appliance. Decoding includes translating the positional numeral system to an appliance configuration.

17 Claims, 2 Drawing Sheets

(56) References Cited

U.S. PATENT DOCUMENTS

| | | | |
|---|---|---|---|
| 2016/0134431 A1* | 5/2016 | Ebrom | H04L 12/2823 |
| | | | 709/217 |
| 2020/0057558 A1* | 2/2020 | Beloussov | G06F 3/0634 |
| 2020/0311040 A1* | 10/2020 | Wada | G06F 16/986 |

* cited by examiner

SYSTEM AND METHOD FOR DATA TRANSMISSION FOR APPLIANCE

FIELD OF THE INVENTION

The present subject matter relates generally to consumer or commercial appliances, such as domestic appliances, and more particularly to systems and methods for diagnostics and transmitting data to and from such appliances.

BACKGROUND OF THE INVENTION

Conventional residential or commercial appliances may include components that may have defects from the supplier. In certain instances, components from certain lot numbers or batches may include defective sub-components. After the appliance has been manufactured, such defects may typically be remedied through manufacturer recalls or warranty claims.

Conventional residential or commercial appliances may include components that are utilized with other types of components, or may be operated differently based on the appliance or appliance model to which the component is installed. Differences or issues in performance or reliability may become apparently only after the appliance has been operated by an end-user. Remedies to undesired performance or reliability may be available for the appliance. However, an issue for appliance manufacturers is finding the appliances that have the defective or under-performing components.

Conventional residential or commercial appliances collect and store data during operation that can later be used for diagnostic or other purposes. This data is normally collected on a cycle-by-cycle basis and includes various system parameters depending on the type of appliance. For example, a dishwasher may collect data related to water temperature, water level, sensors states, fault conditions, etc. This data may be useful for a number of purposes, e.g., including service diagnostics, consumer use analysis, etc.

However, datasets or files associated with collection of such data are generally large. Such large files may be prohibitive for streaming through a network for data analysis. Additionally, an aggregation of such large files at a server may result in such large amounts of information being generated and stored that a manufacturer or other user may be technically or financially prohibited from receiving or retaining the data for useful purposes.

Still further, conventional residential or commercial appliances may include components that are sourced from multiple different suppliers, such as to reduce risks by the manufacturer associated with sole-source suppliers. While such component multi-sourcing may reduce supply chain risks, such practices may introduce differences in quality or performance such as described above. In some instances, data may be available relating to one of these issues. However, such as provided above, such data may be inaccessible for manufacturers to utilize to address such problems as provided above.

Accordingly, systems and methods for data transmission, diagnostics, and performance improvement are desired.

BRIEF DESCRIPTION OF THE INVENTION

Aspects and advantages of the invention will be set forth in part in the following description, or may be obvious from the description, or may be learned through practice of the invention.

An aspect of the present disclosure is directed to a system for data transmission for an appliance. The system includes an appliance including a controller operably connected to a network computing device. The controller is configured to transmit a packet to a network computing device. The packet includes genealogical data for the appliance encoded in a positional numeral system. The network computing device is configured to receive the packet and decode the genealogical data for the appliance. Decoding includes translating the positional numeral system to an appliance configuration.

Another aspect of the present disclosure is directed to a computer-implemented method for data transmission and diagnostics for an appliance. The method includes transmitting a packet to a remote server through a network, wherein the packet includes genealogical data encoded in a positional numeral system; receiving the packet at the remote server; and decoding, at the remote server, the genealogical data for the appliance, wherein decoding includes translating the positional numeral system to an appliance configuration.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
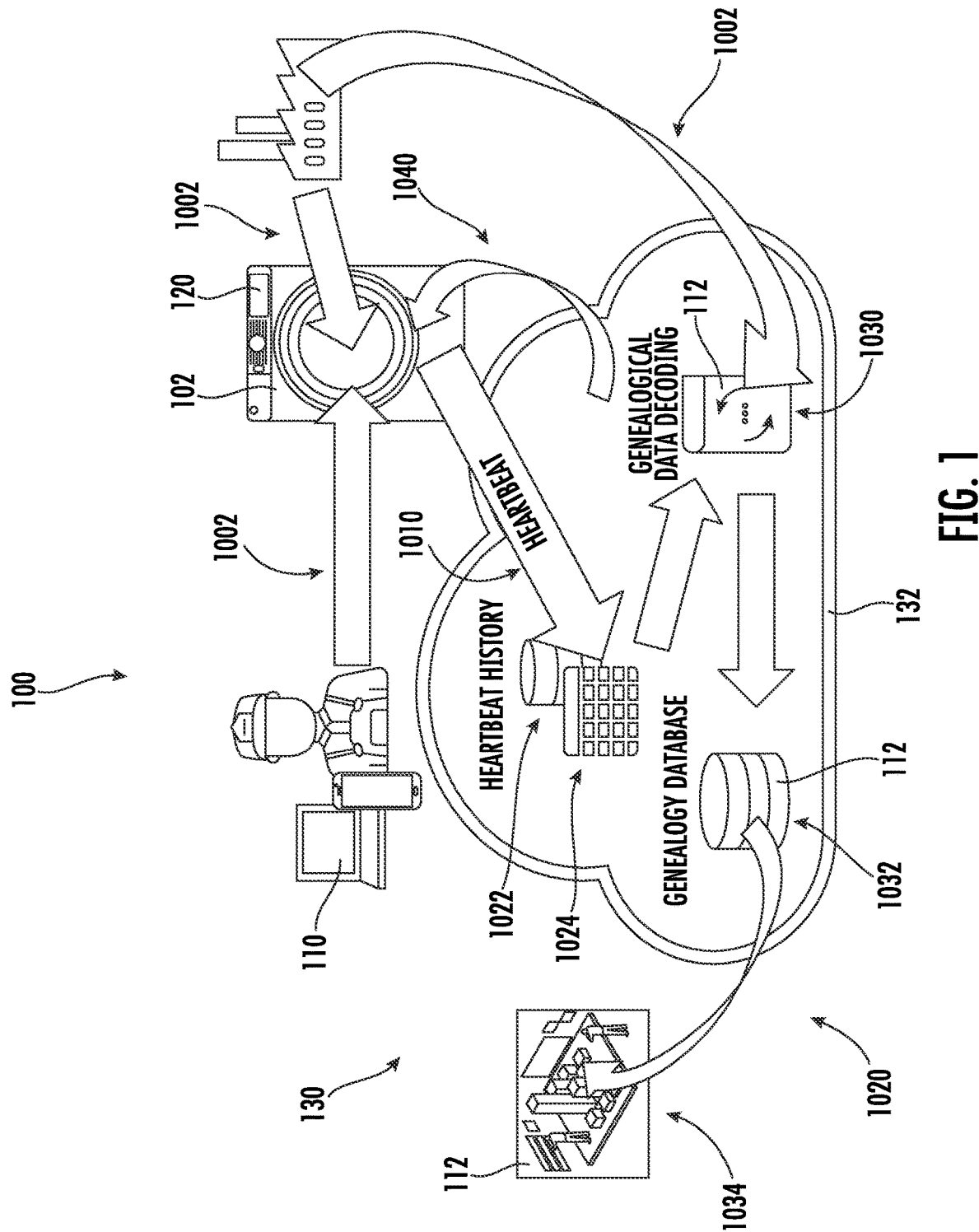
FIG. 1 provides a schematic diagram depicting the system executing steps of the method for data transmission and performance improvement for an appliance in accordance with aspects of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

Referring now to FIG. 1, a system of appliances 100 will be described according to exemplary embodiments of the present subject matter. In general, system of appliances 100 may include any suitable number, type, and configuration of appliances, remote servers, network devices, and/or other external devices. Some of these appliances 100 may be able to communicate with each other or are otherwise interconnected. This interconnection, interlinking, and interoperability of multiple appliances and/or devices may commonly be referred to as "smart home" or "connected home" appliance interconnectivity.

FIG. 1 illustrates system of appliances 100 according to exemplary embodiments of the present subject matter. As shown, system of appliances 100 generally includes a first appliance 102, or furthermore a second appliance, or furthermore and a third appliance, etc. Details regarding the operation of first appliance 102, second appliance, and third appliance may be understood by one having ordinary skill in the art and detailed discussion is omitted herein for brevity. However, it should be appreciated that the specific appliance types and configurations are only exemplary and are provided to facilitate discussion regarding the use and operation of an exemplary system of appliances 100. The scope of the present subject matter is not limited to the number, type, and configurations of appliances set forth herein.

For example, the system of appliances 100 may include any suitable number and type of "appliances," such as "household appliances." These terms are used herein to describe appliances typically used or intended for common domestic tasks, e.g., such as the appliances as illustrated in the figures. According to still other embodiments, these "appliances" may include but are not limited to a refrigerator, a dishwasher, a microwave oven, a cooktop, an oven, a washing machine, a dryer, a water heater, a water filter or purifier, an air conditioner, a space heater, and any other household appliance which performs similar functions. Moreover, although only three appliances are illustrated, various embodiments of the present subject matter may also include another number of appliances, each of which may generate and store data.

In addition, it should be appreciated that system of appliances 100 may include one or more external devices, e.g., devices that are separate from or external to the one or more appliances, and which may be configured for facilitating communications with various appliances or other devices. For example, the system of appliances 100 may include or be communicatively coupled with a remote user interface device 110 that may be configured to allow user interaction with some or all appliances or other devices in the system of appliances 100.

In general, remote user interface device 110 may be any suitable device separate and apart from appliances that is configured to provide and/or receive communications, information, data, or commands from a user. In this regard, remote user interface device 110 may be an additional user interface to the user interface panels of the various appliances within the system of appliances 100. In this regard, for example, the user interface device 110 may be a personal phone, a smartphone, a tablet, a laptop or personal computer, a wearable device, a smart home system, or another mobile or remote device. For example, the separate device may be a smartphone operable to store and run applications, also known as "apps," and the remote user interface device 110 be provided as a smartphone app.

As will be described in more detail below, some or all of the system of appliances 100 may include or be communicatively coupled with a remote server 112 that may be in operative communication with some or all appliances within system of appliances 100. Thus, user interface device 110 and/or remote server 112 may refer to one or more devices that are not considered household appliances as used herein. In addition, devices such as a personal computer, router, network devices, and other similar devices whose primary functions are network communication and/or data processing are not considered household appliances as used herein.

As illustrated, each of appliance 102, remote user interface device 110, or any other devices or appliances in system of appliances 100 may include or be operably coupled to a controller, identified herein generally by reference numeral 120. As used herein, the terms "processing device," "computing device," "controller," or the like may generally refer to any suitable processing device, such as a general or special purpose microprocessor, a microcontroller, an integrated circuit, an application specific integrated circuit (ASIC), a digital signal processor (DSP), a field-programmable gate array (FPGA), a logic device, one or more central processing units (CPUs), a graphics processing units (GPUs), processing units performing other specialized calculations, semiconductor devices, etc. In addition, these "controllers" are not necessarily restricted to a single element but may include any suitable number, type, and configuration of processing devices integrated in any suitable manner to facilitate appliance operation. Alternatively, controller 120 may be constructed without using a microprocessor, e.g., using a combination of discrete analog and/or digital logic circuitry (such as switches, amplifiers, integrators, comparators, flip-flops, AND/OR gates, and the like) to perform control functionality instead of relying upon software.

Controller 120 may include, or be associated with, one or more memory elements or non-transitory computer-readable storage mediums, such as RAM, ROM, EEPROM, EPROM, flash memory devices, magnetic disks, or other suitable memory devices (including combinations thereof). These memory devices may be a separate component from the processor or may be included onboard within the processor. In addition, these memory devices can store information and/or data accessible by the one or more processors, including instructions that can be executed by the one or more processors. It should be appreciated that the instructions can be software written in any suitable programming language or can be implemented in hardware. Additionally, or alternatively, the instructions can be executed logically and/or virtually using separate threads on one or more processors.

For example, controller 120 may be operable to execute programming instructions or micro-control code associated with an operating cycle of an appliance. In this regard, the instructions may be software or any set of instructions that when executed by the processing device, cause the processing device to perform operations, such as running one or more software applications, displaying a user interface, receiving user input, processing user input, etc. Moreover, it should be noted that controller 120 as disclosed herein is additionally, or alternatively, configured to store, execute, or otherwise operate or perform any one or more methods, method steps, or portions of methods as disclosed herein. For example, in some embodiments, methods disclosed herein may be embodied in programming instructions stored in the memory and executed by controller 120. The memory devices may also store data that can be retrieved, manipulated, created, or stored by the one or more processors or portions of controller 120. One or more database(s) can be connected to controller 120 through any suitable communication module, communication lines, or network(s).

Referring still to FIG. 1, a schematic diagram of an external communication system 130 will be described according to an exemplary embodiment of the present subject matter. In general, external communication system 130 is configured for permitting interaction, data transfer, and other communications between and among one or more of the appliances, remote user interface device 110, and the remote server 112. For example, this communication may be used to transmit packets of data through a network 132 and to the remote server 112 and to receive at one or more appliances an operational parameter adjustment corresponding to one or more of operating parameters, cycle settings, user instructions or notifications, performance characteristics, user preferences, or any other suitable information for improved performance of one or more appliances within system of appliances 100.

In addition, remote server 112 may be in communication with an appliance and/or remote user interface device 110 through the network 132. In this regard, for example, remote server 112 may be a cloud-based server 112, and is thus located at a distant location, such as in a separate state, country, etc. According to an exemplary embodiment, remote user interface device 110 may communicate with a remote server 112 over network 132, such as the Internet, to transmit/receive data packets or information, provide user inputs, receive user notifications or instructions, interact with or control the appliance, etc. In addition, remote user interface device 110 and remote server 112 may communicate with the appliance to communicate similar information.

In general, communication between an appliance, remote user interface device 110, remote server 112, and/or other user devices or appliances may be carried using any type of wired or wireless connection and using any suitable type of communication network, non-limiting examples of which are provided below. For example, remote user interface device 110 may be in direct or indirect communication with the appliance through any suitable wired or wireless communication connections or interfaces, such as network 132. For example, network 132 may include one or more of a local area network (LAN), a wide area network (WAN), a personal area network (PAN), the Internet, a cellular network, any other suitable short- or long-range wireless networks, etc. In addition, communications may be transmitted using any suitable communications devices or protocols, such as via Wi-Fi®, Bluetooth®, Zigbee®, wireless radio, laser, infrared, Ethernet type devices and interfaces, etc. In addition, such communication may use a variety of communication protocols (e.g., TCP/IP, HTTP, SMTP, FTP), encodings or formats (e.g., HTML, XML), and/or protection schemes (e.g., VPN, secure HTTP, SSL).

External communication system 130 is described herein according to an exemplary embodiment of the present subject matter. However, it should be appreciated that the exemplary functions and configurations of external communication system 130 provided herein are used only as examples to facilitate description of aspects of the present subject matter. System configurations may vary, other communication devices may be used to communicate directly or indirectly with one or more associated appliances, other communication protocols and steps may be implemented, etc. These variations and modifications are contemplated as within the scope of the present subject matter.

Now that the construction of system of appliances 100 and external communication system 130 have been presented according to exemplary embodiments, an exemplary method 1000 for data transmission for an appliance will be described. Although the discussion below refers to the exemplary method 1000 of operating an appliance from system of appliances 100, one skilled in the art will appreciate that the exemplary method 1000 is applicable to the memory usage and/or data allocation of any suitable number, type, and configuration of appliances. In exemplary embodiments, the various method steps as disclosed herein may be performed by one or more controllers (e.g., such as controllers 120) or by a separate, dedicated controller that may be located locally on one or more of the appliances, remotely on a remote server, or remote user interface device 110, etc.

Notably, as explained briefly described above, consumer and commercial appliances commonly generate large amounts of data during normal operation. This data, referred to herein generally as "diagnostics data" or "appliance performance data", may be used for a variety of purposes by the user of the appliance or a third-party (e.g., such as the manufacturer). For example, this data may be used for performance analysis, diagnostic analysis, fault detection, root cause analysis, analysis of consumer use habits, or for any other suitable purpose generally intended for improving appliance performance and user satisfaction.

Notably, the receipt and storage of such large volumes of data may be expensive and the onboard storage capacity of conventional appliances may become a limiting factor in data storage, particularly as appliances become more complex and the need for more data increases. In this regard, as described briefly above, each appliance controller (e.g., controllers 120) may have a limited amount of system memory that is capable of storing diagnostics data.

Furthermore, data packets as described herein include, at least, a configuration identifier that identifies one or more component types at the appliance, a manufacturer identifier that identifies a supplier or manufacturer of each component, a logistical identifier that identifies a lot number, a batch number, a serial number, or other manufacturing data of the component, a version identifier corresponding to software or control algorithm associated with the component, or other identifying information of specific components of the appliance, which may be referred to herein as "genealogical data". In particular, such genealogical data allows for differentiation between appliances of the same model type (e.g., an appliance of model A) based on one or more of the configuration identifier, manufacturer identifier, logistical identifier, version identifier, or combinations thereof, such as to distinguish among appliances of the same model type (e.g., plurality of appliances of model A) having components from various suppliers, lot numbers, batch numbers, version numbers, etc.

The type of appliance data that is desirable is largely dependent on the end user of such data. For example, a service technician who is troubleshooting an appliance fault may desire a large number of cycle records or a long history of appliance operation but may require relatively few recorded parameters in order to determine the root cause of such faults during a maintenance visit or service call. By contrast, a data analyst focusing on user routines or habits from a remote location may not require as many cycle records to be saved by the machine since the data is streamed and stored in a remote server. Other users may desire an entirely different combination of data for their purposes. The situations result in a conflict between desirable diagnostics data that is stored and the available system resources. Accordingly, aspects of the present subject matter are directed to methods for improved storage of diagnostics data in an appliance.

Figure 2:
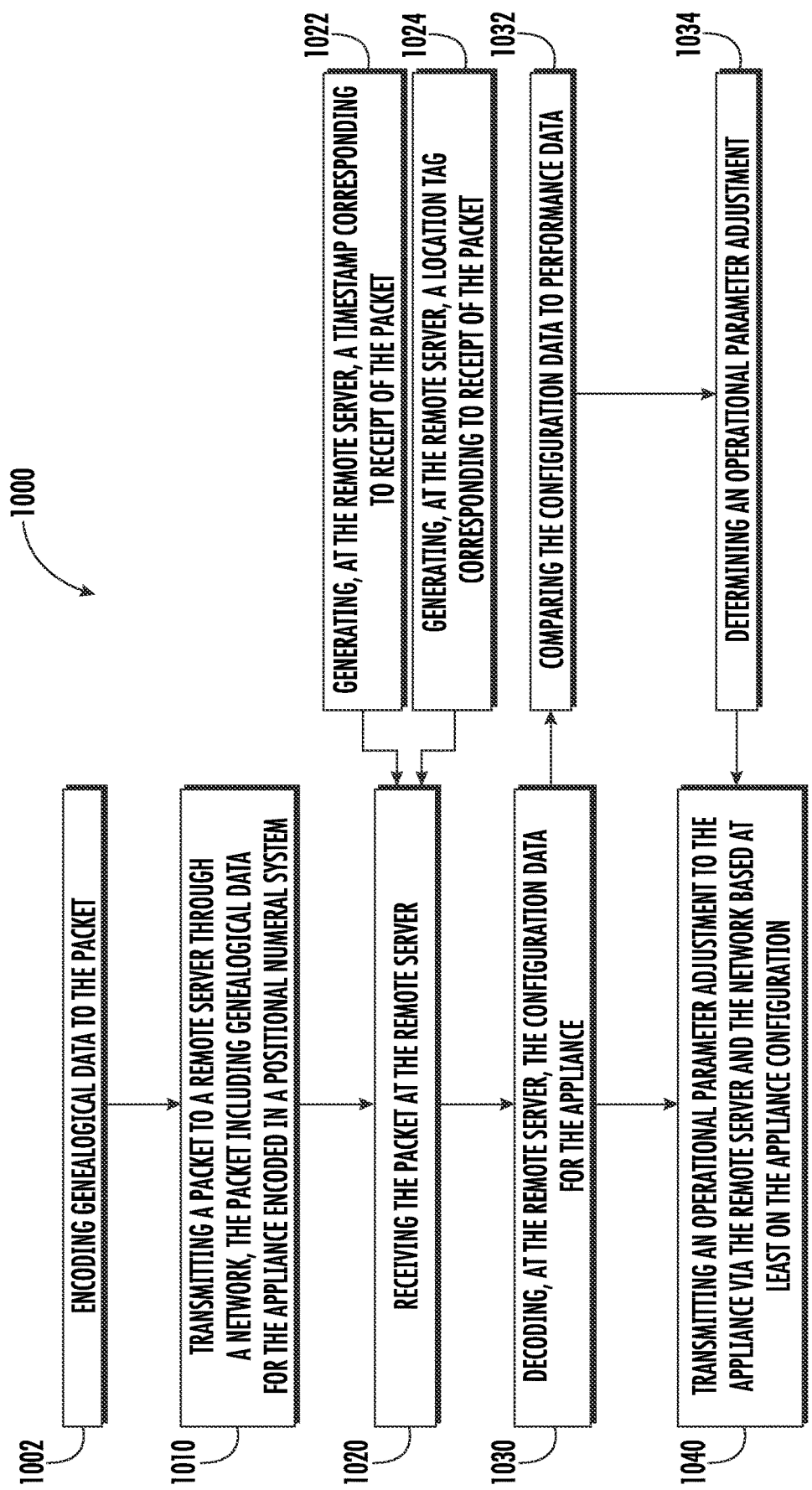
FIG. 2 provides a flowchart outlining steps of a method for data transmission and performance improvement for an appliance in accordance with aspects of the present disclosure.

Referring now to FIG. 2, embodiments of a method for data transmission for an appliance is provided (hereinafter, "method 1000"). Embodiments of the method 1000, or steps thereof, may be executed at one or more appliances, such as any one or more of appliances or the system of appliances 100, such as described in regard to FIG. 1. However, it should be appreciated that method 1000 may be stored or executed with other embodiments of appliances or networks. Appliances may include, but are not limited to, a refrigerator appliance, a freezer appliance, a laundry washing appliance, a laundry drying appliance, a dishwashing appliance, a cooking appliance, a microwave appliance, an air conditioner appliance, a heater appliance, a beverage-maker appliance, or other appropriate type of appliance that may be connected to a network and server. Steps of the method 1000 may be stored as instructions and executed as operations at controller 120, remote server 112, or user interface device 110 and transmitted via network 132. However, it should be appreciated that method 1000 may be stored, executed, and operates in other embodiments of a network, computing device, server, or appliance without substantially deviating from the present subject matter.

Embodiments of the system 100 or method 1000 herein provide an appliance genealogy system including a cloud heartbeat of an encoded network packet transmitted at a desired frequency or rate from one or more connected appliances to a network, such as a cloud network (e.g., network 132). The packet is decoded at a remote server (e.g., remote server 112), such as to determine genealogical data for the appliance. A plurality of packets received from each appliance may be compared to one another, or particularly to performance data associated with the appliances. An operational parameter adjustment may be determined based on comparing the packets. The operational parameter adjustment may include a control change, software change, speed, frequency, amplitude, angular, rate, velocity, acceleration, volume, or other quantitative change or change to an operating limit of an associated component, or a determination of physical hardware change, such as to be implemented by a technician. In one instance, the physical hardware change may be a recall, replacement, or performance improvement of a component based on a particular manufacturer, supplier, lot number, or other logistical identifier associated with particular component(s) at the appliance. Accordingly, embodiments of the system and method herein may allow for targeted recalls, replacements, or improvements in contrast to recalls of entire model families of appliance.

Referring to FIG. 2, embodiments of the method 1000 include at 1002 encoding genealogical data to the packet. As described above and further herein, the genealogical data includes one or more of a configuration identifier, a manufacturer identifier, a logistical identifier, a version identifier, or combinations thereof Embodiments of the method 1000 include at 1010 transmitting a packet to a network computing device, such as to remote server through a network. The packet includes appliance data for the appliance encoded in a positional numeral system.

In particular embodiments, the encoded packet includes a quantity of bytes having a positional numeral system greater than base 2. In particular embodiments, the positional numeral system is hexadecimal or base 12 (e.g., 1, 2, 3, 4, 5, 6, 7, 8, 9, A, B, C, D, E, F). The method 1000 includes at 1020 receiving the packet at the remote server and at 1030 decoding, at the remote server, the genealogical data for the appliance. At the remote server, a computing device decodes or compares the positional numeral system of the packet to a decoder, such as a table, schedule, chart, list, or other decoder dataset identifying genealogical data from the packet. The method 1000 at 1030 may particularly include translating the positional numeral system to an appliance configuration. The appliance configuration includes a particular combination of component types (e.g., a particular combination of component types, logistical data, The packet, the decoder dataset, or both, is stored at the remote server or transmitted to another appropriate database, server, or computing device. The packet contains genealogical data such as described above and further herein.

In particular embodiments, the packet contains bytes corresponding to an appliance configuration for the appliance from which the packet is transmitted. For instance, a first byte, or a plurality of first bytes, may each correspond to a component type for the appliance. The component type may include, but is not limited to, a motor, a compressor, an evaporator, a condenser, a heat exchanger, a fan, a control unit, a computing device, etc. of the appliance. The component type may particularly include any appropriate component or key component that may be serviced or serviceable by a technician, actuatable hardware, control components, control boards, etc.

In another instance, a second byte, or a plurality of second bytes, may correspond to a supplier or manufacturer identifier corresponding first byte or plurality of first bytes for the component type. For example, the component type corresponding to the first byte may be manufactured or sourced from various suppliers or manufacturers. The second byte or plurality of second bytes corresponds to the specific supplier or manufacturer of the component corresponding to the first byte or plurality of first bytes.

In still another instance, a third byte, or a plurality of third bytes, may correspond to a lot number, a serial number, or other logistical identifier for the component type. For example, the supplier or manufacturer corresponding to the second byte or plurality of second bytes corresponds the logistical identifier of the component type from the supplier or manufacturer. It should be appreciated that, in certain embodiments, the manufacturer identifier and the logistical identifier may be contained in the same bytes, such that the logistical identifier furthermore identifies the supplier or manufacturer.

Accordingly, the relatively small packet contains genealogical data corresponding to the specific combination of components, component suppliers, and logistical data for each appliance. In particular, the packet encoding the genealogical data in a positional numeral system format allows for large combinations or potential combinations of configurations to be stored and transmitted in relatively small data file sizes. In a still particular embodiment, the packet encoding the genealogical data in a hexadecimal positional numeral system allows for large combinations of appliance configurations to be stored and transmitted in relatively small data file sizes.

In another embodiment, the packet may include a fourth byte, or a plurality of fourth bytes, corresponding to an appliance type. It should be appreciated that particular configurations of appliance, such as may be encoded in one or more bytes as described above, may correspond to specific appliance types. Accordingly, appliance type data may be included as the fourth byte in the packet, or may be inferred from the combination of components included in the packet. For instance, the combination of components may include components that correspond to specifically a refrigerator appliance, a freezer appliance, a laundry washing appliance, a laundry drying appliance, a dishwashing appliance, a cooking appliance, a microwave appliance, an air conditioner appliance, a heater appliance, a beverage-maker appliance, or other appropriate type of appliance that may be connected to connected to the network 132.

As provided at 1020, the remote server receives the packet and at 1030 decodes the positional numeral values to translate the packet into a long-form description of a configuration of the appliance, referred to herein as "appliance configuration." The appliance configuration includes details relating to one or more of the component types, the supplier or manufacturer of each component type, a lot number, batch number, assembly or manufacturing data, or other manufacturing data corresponding to the component, or other information as may be included in the packet, relating to the specific appliance.

Various embodiments of methods and system provided herein further include periodically transmitting the packet, such as a "cloud heartbeat". A corresponding frequency or rate may be one per hour, or one per day, or one per week, or one per month, etc. In certain embodiments, method 1000 includes at 1022 generating a timestamp corresponding to each packet received. In particular embodiments, generating the timestamp is performed at the remote server or the network, such as to allow for a reduced size of the packet generated, stored, or transmitted through the network. Accordingly, when values of the packet change, a timestamp is generated at the remote server to correlate the change in appliance configuration to a time at which the configuration occurred. Particularly, such temporal data may be generated and received without necessitating generation and transmission by the appliance, such as allowing for relatively smaller packet sizes. Stated differently, the packet may not require values corresponding to particular timestamps. Rather, embodiments of the system and method compare changes in the positional numeral values to timestamps corresponding to when the packet is received at the remote server such as to determine a time at which component changes or control changes have occurred.

Still various embodiments of the method 1000 include at 1024 generating a location tag corresponding to each packet. In a particular embodiment, the remote server may generate a location tag corresponding to each packet, such as to correlate a location or custody of the appliance to the packet. Particularly, such location data may be generated and received without necessitating generation and transmission by the appliance, such as allowing for relatively smaller packet sizes. Stated differently, the packet may not require values corresponding to particular location of the appliance. Rather, embodiments of the system and method compare changes in the positional numerical values to changes in location tags corresponding to determine whether a physical location of the appliance has moved. More particularly, the method and system may determine when an appliance has moved to a different building.

As described herein, certain embodiments of the method 1000 include at 1034 determining an operational parameter adjustment. In a particular embodiment, method 1000 includes at 1032 comparing the appliance configuration to performance data. Method 1000 at 1034 may determine the operational parameter adjustment based on comparing the appliance configuration to performance data. In one embodiment, comparing the appliance configuration to performance data includes comparing the appliance configuration corresponding to a plurality of packets received from a plurality of appliances to a plurality of performance data corresponding to the respective plurality of appliances.

As provided in FIG. 1, a technician, a manufacturer, or both, may generate an encoded packet, such as described in regard to step 1002. When a component is replaced at an appliance, a technician or other user may update the packet information to reflect changed component, corresponding manufacturer identifier, logistical identifier, version identifier, or other data associated with the changed component. The packet transmitted to the remote server (e.g., method 1000 at 1010) then contains genealogical data corresponding to the updated appliance configuration. In certain embodiments, temporal data or location data associated with the packet (e.g., method 1000 at 1022 or 1024) is attached or correlated to the packets, such as to identify when or where the appliance configuration change occurred.

System 100 and method 1000 may further compare the packets received from each of a plurality of appliances (e.g., method 1000 at 1032) and identify trends, correlations regressions, interpolations, or extrapolations associated with the various appliance configurations, or more particularly, genealogical data such as configuration identifiers, manufacturer identifiers, logistical identifiers, or version identifiers. For instance, comparing the packets may identify that a certain lot number of a particular component is replaced at a certain rate, or after a certain period of time, in contrast to other lot numbers of the component. In one instance, determining an operational parameter adjustment, such as a quality analysis, may determine that the lot number of the component is defective and a recall or replacement may be ordered relative to the specific lot number for the component, rather than for the appliance model generally or the component generally. In another instance, the quality analysis may determine that the lot number of the component is defective and a software change may be ordered relative to the specific lot number of the component. In still another instance, the quality analysis may determine that the lot number of the component is defective and a software change may be ordered relative to the specific lot number of the component when operating with one or more other specific components, or lot numbers thereof.

It should be appreciated that embodiments of the method 1000 and system 100 allow for other instances for determining performance, failure, or diagnostics based on supplier or manufacturer identifiers, software version identifiers, or combinations thereof. For instance, the quality analysis may determine that certain combinations of components, or particular suppliers, lot numbers, or versions thereof, may perform better or worse than when combined with other configurations. As such, a component may be replaced, or avoided in combination with other components, or a particular software version may be implemented or changed, based on the specific combination with other components. Accordingly, the component may be utilized with better performance in other appliance configurations rather than being scrapped or otherwise treated as defective.

Accordingly, embodiments of the method 1000 and system 100 provided herein allow for determining performance or failure of various appliance configurations. More particularly, embodiments provided herein allow for determining performance or failure without necessitating diagnostics or performance data to be transmitted in the packet from the appliance through the network. As such, embodiments provided herein allow for improved maintenance, performance analysis, or failure determination using less data and smaller file sizes.

Embodiments of the method 1000 may further include at 1040 transmitting an operational parameter adjustment to the appliance via the remote server and the network based at least on the decoded genealogical data. As provided herein, the operational parameter adjustment may include a software change, a component change, or a signal indicative of a hardware, software, or other operational change to be performed at the appliance.

In certain embodiments of the method 1000, the packet may include a fifth byte or plurality of fifth bytes defining an operating condition of the component. For instance, the positional numeral value defining a hexadecimal may correlate to one of up to sixteen operating conditions (or more if a plurality of fifth bytes is utilized). In a particular embodiment, a value of 1 may correspond to a "new" or "best" operating condition, and a value of F (or G in certain nomenclature) may correspond to a "worst" operating condition, and values therebetween (e.g., values 2 through E or F) may correspond to gradations of operating conditions between 1 and F. As such, the packet may include detailed performance data corresponding to each component type, supplier or manufacturer identifier, logistical identifier, version identifier, or other genealogical datum, or combinations of appliance configuration.

Embodiments of the system 100 and method 1000 may include generating, at the network or the remote server, a first dataset corresponding to a chronological history, a geographic history, or both, of the packet, referred to as "heartbeat history" in FIG. 1. The method 1000 performs genealogical data decoding, such as at the network or remote server. The method 1000 may further transmit or store such long-form data at a genealogy database. The genealogy database may include performance data of the plurality of packets received from the plurality of appliances. Users may obtain or access the genealogy database to determine an operational parameter adjustment, such as described herein. The operational parameter adjustment may then be transmitted to the appliance as a software change or a signal indicative of a hardware change.

Embodiments of the system and method provided herein allow for relatively small packets to transmit data corresponding to specific combinations of component type and lot or serial number for each appliance. When received by an appliance manufacturer, a user or quality analysis may compare performance of specific component types, or specific lots, batches, or serial numbers of the component, or software or controller versions, such as to determine whether certain appliance configurations, or more particularly, e.g., suppliers, manufacturers, lot numbers, manufactured batches, controller versions, geographic locations, temporal periods, or combinations with particular components, or specific configurations thereof, may correspond to improved or deleterious performance, certain success or failure rates, or other performance indicators. Still further, such determinations may be performed utilizing relatively small data packets received over a period of time that correspond to specific appliance configurations and changes therein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An appliance data transmission system, the system comprising:

an appliance comprising a controller operably connected to a network computing device, the controller configured to encode genealogical data to a packet in hexadecimal format, wherein the genealogical data is encoded in a positional numeral system, the genealogical data comprising a configuration identifier, a manufacturer identifier, a logistical identifier, a version identifier, or combinations thereof, allowing for differentiation of appliances of the same model type based on one or more of the configuration identifier, the manufacturer identifier, the logistical identifier, or the version identifier, the controller configured to periodically transmit the packet to the network computing device;

wherein the network computing device is configured to receive the packet and decode the genealogical data for the appliance, wherein decoding comprises translating the positional numeral system to an appliance configuration, and wherein the network computing device is configured to compare genealogical data from a plurality of packets periodically received from each of a plurality of the appliances, and wherein the network computing device is configured to compare genealogical data from the periodically transmitted packets to determine at the remote server an operational parameter adjustment corresponding to one or more of the configuration identifier, the manufacturer identifier, the logistical identifier, or the version identifier associated with one or more appliance configurations corresponding to one or more appliances of the plurality of the appliances; and wherein the network computing device is configured to compare appliance configurations to identify a trend, a correlation, a regression, an interpolation, or an extrapolation associated with the appliance configurations of the plurality of the appliances, and wherein the operational parameter adjustment identifies a defective component associated with one or more appliance configurations.

2. The system of claim 1, wherein the network computing device is configured to transmit the operational parameter adjustment, wherein the operational parameter adjustment comprises a control change, a software change, an operating limit, or an identification of component replacement at the appliance to be implemented by a technician.

3. The system of claim 1, wherein the network computing device is configured to determine the operational parameter adjustment based on comparing the appliance configuration to performance data.

4. The system of claim 3, wherein determining the operational parameter adjustment comprises comparing the appliance data corresponding to a plurality of packets received from a plurality of appliances to a plurality of performance data corresponding to the respective plurality of appliances.

5. The system of claim 1, wherein the network computing device is configured to generate a timestamp corresponding to receiving the packet to reduce a size of the packet transmitted through the network.

6. The system of claim 1, wherein the network computing device is configured to generate a location tag corresponding to receipt of the packet.

7. A computer-implemented method for data transmission and diagnostics for an appliance, the method comprising:
periodically transmitting a plurality of packets from each of a plurality of appliances to a remote server through a network, wherein each packet comprises genealogical data encoded in a positional numeral system, the genealogical data comprising a configuration identifier, a manufacturer identifier, a logistical identifier, a version identifier, or combinations thereof, allowing for differentiation of one or more components of the plurality of appliances based on one or more of the configuration identifier, the manufacturer identifier, the logistical identifier, or the version identifier, wherein differentiation of one or more components of the plurality of appliances allows for differentiation of the plurality of appliances of similar model type;
receiving, at the remote server, the plurality of packets from each of the plurality of appliances;
decoding, at the remote server, the genealogical data for each of the plurality the appliances, wherein decoding comprises translating the positional numeral system to an appliance configuration corresponding to each of the plurality of appliances;
comparing, at the remote server, appliance configurations corresponding to each of the plurality of appliances, wherein comparing appliance configurations comprises identifying a trend, a correlation, a regression, an interpolation, or an extrapolation associated with the appliance configurations of the plurality of appliances; and
determining, from comparing the appliance configurations, an operational parameter adjustment corresponding to one or more of the configuration identifier, the manufacturer identifier, the logistical identifier, or the version identifier associated with one or more appliance configurations corresponding to one or more appliances of the plurality of appliances, wherein determining the operational parameter adjustment identifies a defective component associated with one or more appliance configurations.

8. The method of claim 7, the method comprising:
transmitting the operational parameter adjustment to the appliance via the remote server and the network, wherein the operational parameter adjustment comprises a control change, a software change, an operating limit, or an identification of component replacement at the appliance to be implemented by a technician.

9. The method of claim 7, the method comprising:
comparing the plurality of appliance configurations corresponding to the plurality of appliances to performance data; and
determining the operational parameter adjustment based on comparing the appliance configuration to performance data.

10. The method of claim 9, wherein determining the operational parameter adjustment comprises comparing the appliance data corresponding to the plurality of packets received from the plurality of appliances to a plurality of performance data corresponding to the respective plurality of appliances.

11. The method of claim 7, the method comprising:
generating, at the remote server, a timestamp corresponding to receiving each packet.

12. The method of claim 7, the method comprising:
generating, at the remote server, a location tag corresponding to receipt of the plurality of packets.

13. The method of claim 7, wherein the positional numeral system is a hexadecimal numeral system.

14. The method of claim 7, wherein the defective component comprises a component to be replaced or avoided in combination with one or more other components of the appliance configuration associated with the defective component.

15. The method of claim 7, transmitting, from the remote server to the appliance corresponding to the defective component, a signal corresponding to the operational parameter adjustment, wherein the operational parameter adjustment identifies a physical component replacement at the appliance to be implemented by a technician.

16. The method of claim 11, the method comprising:
comparing, at the remote server, a change in positional numeral value between the plurality of packets to respective timestamps corresponding to when each packet is received at the remote server to determine a time at which a component change or control change has occurred at the appliance.

17. The system of claim 1, wherein the defective component comprises a component to be replaced or avoided in combination with one or more other components of the appliance configuration associated with the defective component.

* * * * *